(12) United States Patent
Ferguson Tucker

(10) Patent No.: US 9,921,085 B2
(45) Date of Patent: Mar. 20, 2018

(54) METHOD FOR ACTIVE SENSOR SIGNAL OPTIMIZATION

(71) Applicant: HONEYWELL FEDERAL MANUFACTURING & TECHNOLOGIES, LLC, Kansas City, MO (US)

(72) Inventor: Ryand Jeremy Ferguson Tucker, Belton, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 222 days.

(21) Appl. No.: 14/845,131

(22) Filed: Sep. 3, 2015

(65) Prior Publication Data
US 2017/0067762 A1    Mar. 9, 2017

(51) Int. Cl.
*G01R 31/28*    (2006.01)
*G01D 18/00*    (2006.01)
*G01D 5/353*    (2006.01)

(52) U.S. Cl.
CPC ............. *G01D 18/00* (2013.01); *G01D 5/353* (2013.01); *Y10T 29/49004* (2015.01); *Y10T 29/49826* (2015.01)

(58) Field of Classification Search
CPC .... H05B 33/0872; H05B 37/02; G01R 35/00; F21K 9/20; G01L 1/242; G01B 11/161; G01B 11/165; G01H 9/00; G01H 9/004; Y10S 435/808; Y10T 29/49826; Y10T 29/49004

USPC ................... 29/593, 428, 603.09, 603.1, 833
See application file for complete search history.

(56) References Cited

U.S. PATENT DOCUMENTS

| | | | |
|---|---|---|---|
| 5,265,179 A | 11/1993 | Ishiguro et al. | |
| 7,333,189 B2 * | 2/2008 | Fulghum, Jr. | A61B 5/0071 356/338 |
| 7,356,207 B2 | 4/2008 | Sanders | |
| 7,815,862 B2 | 10/2010 | Sopori | |
| 8,041,161 B1 | 10/2011 | Lane et al. | |
| 8,254,735 B2 | 8/2012 | Tsai | |
| 8,503,840 B2 | 8/2013 | Hu et al. | |
| 9,052,478 B2 | 6/2015 | Charbonneau-Lefort | |
| 9,091,637 B2 * | 7/2015 | Yu | G01N 21/255 |

* cited by examiner

*Primary Examiner* — Thiem Phan
(74) *Attorney, Agent, or Firm* — Hovey Williams LLP

(57) ABSTRACT

A system and method for optimizing a fiber optic sensor by properly clocking or rotationally orienting a window with a fiber optic focuser. This method may include shining light through the focuser into the window and receiving with a reflectometer a first reflection from a first surface of the window and a second reflection from a second surface of the window. Next, the method may include calculating a delta of intensities between the first and second reflections, and then rotating an orientation of the window to a next rotational orientation. The steps of rotating the orientation of the window, receiving reflections, and calculating their delta may be repeated any plurality of times to solve for a plurality of deltas. Then, the method may include the steps of determining which one of the deltas is the largest and fixing the window to the focuser at a rotational orientation associated therewith.

10 Claims, 3 Drawing Sheets

METHOD FOR ACTIVE SENSOR SIGNAL OPTIMIZATION

BACKGROUND

Optical fiber sensors having a fiber optic focuser and window may be used in a broad range of industries. For example, the optical fiber sensors may be used to detect pressure change by way of a Doppler shift applied to the window. To optimize performance in such sensors, clocking or identifying an ideal rotational orientation of the window with the focuser may be desirable. Prior art methods of manufacturing these sensors either overlook such optimization entirely during assembly of these optical fiber sensors or simply use approximate alignment marks in an attempt to control proper clocking or rotational orientation of the window in relationship to the fiber optic focuser. Such alignment marks generally do not provide the precision typically desired in fiber optic applications.

SUMMARY OF THE INVENTION

Embodiments of the present invention solve the above-mentioned problems and provide a distinct advance in the art of optimizing performance of optical fiber sensors.

Some embodiments of the invention include a method of optimizing a fiber optic sensor, including the steps of shining light through a fiber optic focuser into a window and receiving with a sensing device, via the fiber optic focuser, a first reflection from a first surface of the window and a second reflection from a second surface of the window. The window may be made of polymer and may have a thickness extending between the first surface and the second surface thereof. In some embodiments of the invention, the second surface may be texturized or diffuse and may be covered with a reflective material. The sensing device may be a reflectometer or the like and may sense intensity of the reflections in decibels. Next, the method may include the steps of calculating a delta or a difference between a sensed value of the first reflection and a sensed value of the second reflection and then rotating an orientation of the window to a next rotational orientation. In some embodiments of the invention, the window is rotated about an axis extending through the fiber optic focuser and substantially perpendicular to the first surface or the second surface of the window.

The steps of receiving reflections, calculating a delta for those reflections, and again rotating the orientation of the window may be repeated to solve for a plurality of deltas. Then, the method may include the steps of determining which one of the plurality of deltas is the largest, and fixing the window to the fiber optic focuser at a rotational orientation associated with a largest one of the deltas. Finally, the method may additionally include a step of removing at least one holding fixture from the window and/or the fiber optic focuser after the window and the fiber optic focuser are fixed together.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
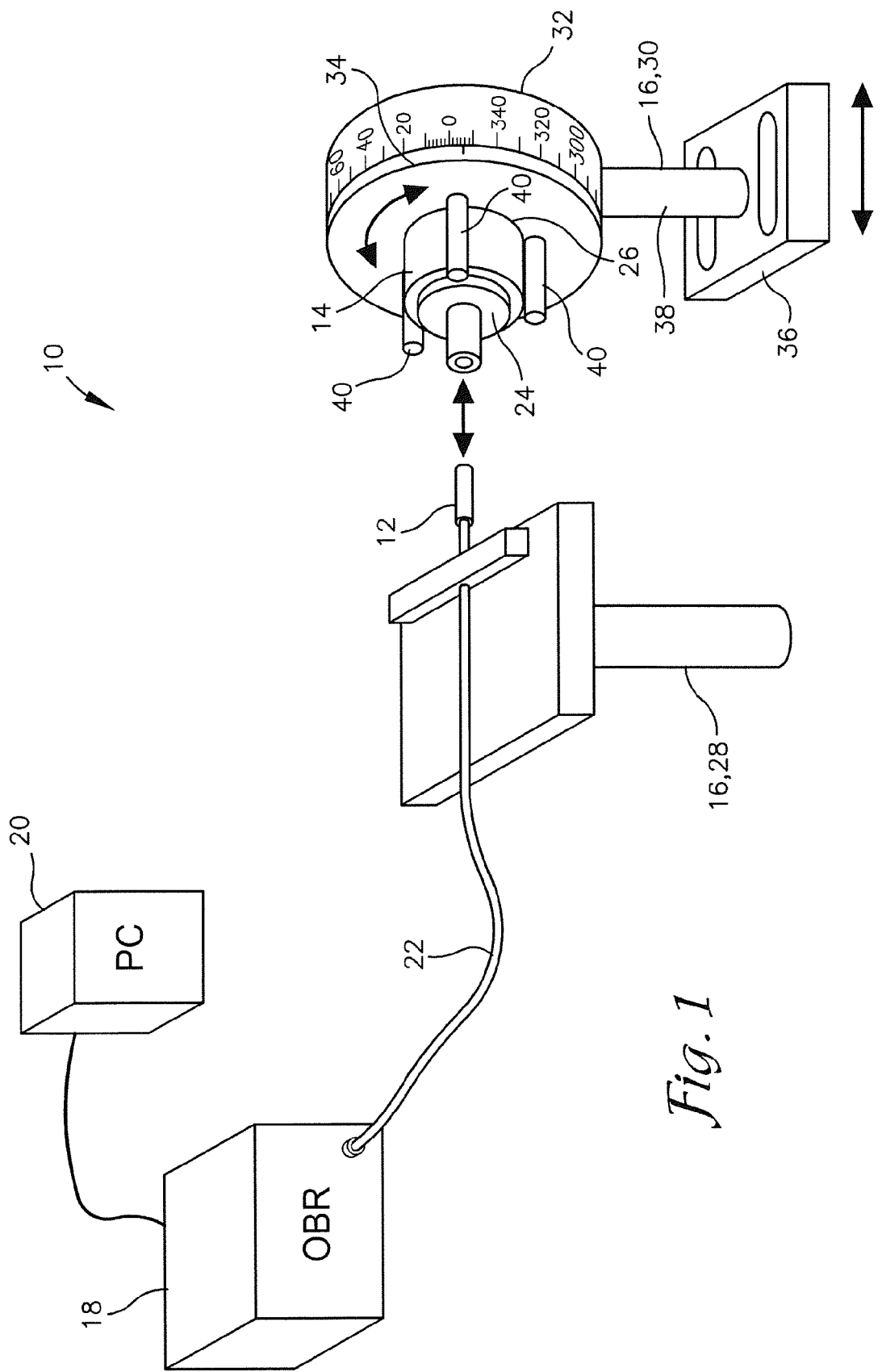
FIG. 1 is a schematic diagram of a clocking system constructed according to embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A clocking system 10 for active sensor signal optimization, constructed in accordance with embodiments of the present invention, is illustrated in FIG. 1. The clocking system 10 may comprise a fiber optic focuser 12, a window 14, one or more holding fixtures 16, a sensing device 18, and/or a processing device 20. The clocking system 10 may cooperatively determine a rotational alignment between the fiber optic focuser 12 and the window 14 which results in an optimum signal, such that the focuser 12 and the window 14 may be fixed in that rotational alignment to form an active sensor. This resulting sensor may be used for Photon Doppler Velocimetry (PDV) or any application requiring alignment of a reflected signal with an incident signal.

The fiber optic focuser 12 may be optically coupled with a fiber optic cable 22, which may optically couple the focuser 12 with the sensing device 18. The focuser 12 may comprise one or more lenses configured to collimate/focus light exiting a fiber or the fiber optic cable 22 to a desired beam diameter or spot size. In some embodiments of the invention, the light projected from the focuser 12 may be at some angle non-perpendicular to surfaces of the window 14 (e.g., approximately 3 degrees) when the focuser 12 itself is perpendicular to the window 14.

The window 14 may be made of various translucent materials, but is preferably made of a polymer, and has a thickness extending between a first surface 24 and a second surface 26, as illustrated in FIG. 1. The second surface 26 may be texturized or otherwise made into a diffuse surface such that the second surface produces diffuse or scattered reflections of light shining thereon. The second surface 26 may also have a reflective material (now shown) applied thereto. Note that references to reflecting from the second surface 26 herein generally refer to a side of the second surface 26 that is facing inward, toward the window 14 and toward the first surface 24, while the reflections from the first surface 24 refer herein to reflecting off of an outer side of the first surface 24, facing outward, away from the window 14 and away from the second surface 26. The window 14 may have any shape and thickness desired for a give application and may be substantially planar or have any desired curvature. For example, in some embodiments of the invention, a distance (i.e., thickness) between the first surface 24 and the second surface 26 may vary across at least portions of the window 14.

The holding fixtures 16 may include a focuser stand 28 and a window mount 30. For example, the focuser stand 28 may include any frames, clamps, or supporting structure configured for holding the focuser and/or the fiber optic cable or optical fiber attached thereto in any arbitrary fixed location, preventing any movement or rotation thereof during the clocking method described below. In the embodiment illustrated in FIG. 1, the focuser stand 28 includes a platform having a ledge with a hole formed therethrough, and the fiber optic cable 22 attached to the focuser 12 extends through the hole.

The window mount 30 may include a fixed structure 32 and a rotatable structure 34 configured to rotate relative to the fixed structure 32. The fixed structure 32 is preferably fixed to or arranged to be fixed relative to the focuser stand 28, so that the only movement between the window 14 and the focuser 12 during the clocking methods described herein is via the rotation of the window 14. However, the fixed structure 32 may be provided with slideable, moveable, or otherwise adjustable components that may be locked into place once a desired configuration is achieved. For example, in some embodiments of the invention, a base 36 of the fixed structure 32 may merely be manually, physically moved close enough to a desired proximity to the focuser 12 and/or the focuser stand 28. However, in other embodiments of the invention, a rod portion 38 of the fixed structure 32 may be slidable toward and away from the focuser 12 and/or focuser stand 28 within a channel formed in the base 36, allowing additional control of the distance between the window 14 and the focuser 12.

The rotatable structure 34 may be a dial configured to allow continuous or incremental 360-degree rotation. This rotation may be clockwise and/or counterclockwise about a center of rotation that is substantially perpendicular to the first surface 24 and/or the second surface 26 of the window 14 and aligned with a center axis of the focuser 12. The rotatable structure 34 may comprise portions configured for removably fixing the window 14 thereto. For example, as illustrated in FIG. 1, a three-finger clamp 40 may be used to fix the window 14 to the rotatable structure 34 of the window mount 30. However, any other mechanical means for fixing the window 14 to the window mount 30 may be used without departing from the scope of the invention. In some embodiments of the invention, a surface of the rotatable structure 34 adjacent the second surface 26 of the window 14, when the window 14 is mounted thereto, may be made of a reflective material, such that the rotatable structure 34 serves as the reflective material applied thereto.

Figure 2:
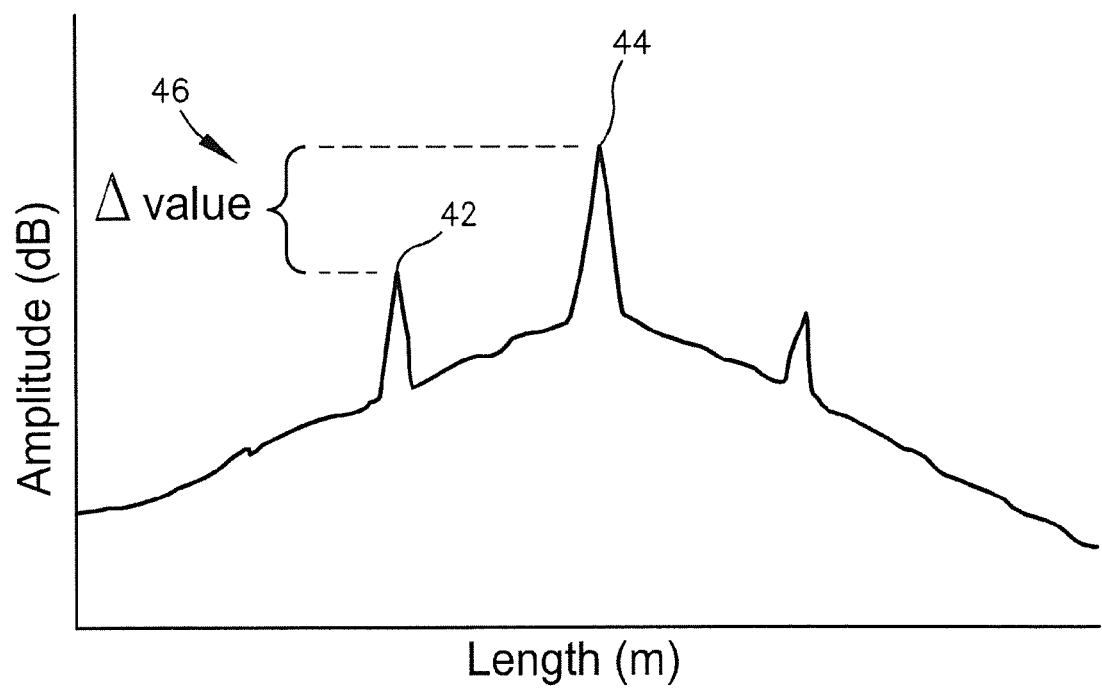
FIG. 2 is a graph that charts reflection data from a sensing device of the clocking system of FIG. 1.

The sensing device 18 may be any sensing device capable of both sending light and receiving reflected light through the focuser 12 via fiber optic cables 22, optical fibers, and the like, and measuring intensity of these reflections in decibels or other such units. For example, the sensing device 18 may be a reflectometer that measures quantities associated with detecting and measuring reflected pulses of energy. Specifically, the sensing device 18 may be an OPTICAL BACKSCATTER REFLECTOMETER (OBR)™ made by Luna of Roanoke, Va. and may measure intensity or compressions of the window based on Doppler effects. The sensing device 18 may send and receive light through the fiber optic cable 22 or optical fiber to and from the focuser 12. The sensing device 18 may also be communicably coupled with the processing device 20, and configured to provide quantities and information regarding sensed reflections from the first surface 24 and the second surface 26 of the window 14 to the processing device 20. An example waveform of the measurements determined by the sensing device 18 is illustrated in FIG. 2. In some embodiments of the invention, such a chart or graph may be visually supplied via the processing device 20 or peripherals communicably coupled therewith. The chart includes a waveform with a first decibel spike 42 representing data reflected back from the first surface 24, a second decibel spike 44 representing data reflected back from the second surface 26, and further illustrates a difference or delta 46 between these two values.

The processing device 20 may be integral to and/or communicably coupled with the sensing device 18. The processing device 20 may comprise a processor and memory (not shown) accessible by and/or housed with the processor. The processing device 20 may include, for example, workstation computers, desktop computers, laptop computers, palmtop computers, notebook computers, tablets or tablet computers, smartphones, mobile phones, cellular phones, personal digital assistants (PDAs), and the like. The processor may communicate with the memory via wired or wireless communication using any communication networks and/or communication protocols known in the art. The processing device 20 may comprise any combination of hardware and software or firmware operated thereon for performing some or all of the method steps described below.

The processor may include microprocessors, microcontrollers, digital signal processors (DSPs), field-programmable gate arrays (FPGAs), analog and/or digital application-specific integrated circuits (ASICs), other electronic circuitry, wires, communication ports, communication busses, and the like, or combinations thereof. The processor may generally execute, process, or run instructions, code, software, firmware, programs, applications, apps, services, daemons, or the like, or may step through states of a finite-state machine.

The memory may include data storage components such as read-only memory (ROM), programmable ROM, erasable programmable ROM, random-access memory (RAM), hard disks, hard disk drives, solid state drives, tape, floppy disks, optical disks, flash memory, SD, thumb drives, universal serial bus (USB) drives, and the like, or any combinations thereof. The memory may include, or may constitute, a "computer-readable medium". The memory may store instructions, code, software, firmware, programs, applications, apps, services, daemons, or the like that are executed by the processor. The processor may be in communication with the memory through address busses, data busses, control lines, and the like.

The processing device 20 may further comprise one or more computer programs stored in or on computer-readable medium residing on or accessible by the processing device 20. For example, the memory described above may comprise computer programs and may be considered computer-readable mediums, as define herein. The computer programs may comprise listings of executable instructions for implementing logical functions in the processing device 20, such as via the processor, and can be embodied in any non-transitory computer-readable medium, such as the memory or other databases accessible by the processor, for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In some embodiments of the invention, the memory may store information for interpreting values provided from the sensing device 18 (e.g., reflectometer). The memory may further comprise algorithms and/or computer code configured for determining differences (referred to herein as deltas) between various values or reflection intensity information provided from the sensing device 18, as well as instructions on how to log, display, and compare the signals received from the sensing device 18. In some embodiments of the invention, the memory may additionally store increments or degrees by which the rotatable structure 34 of the window mount 30 should move, based on various parameters stored and/or input by a user. This value may then be displayed for a user or fed to an actuator or computer numerical control device configured to actuate rotation of the rotatable structure 34 of the window mount 30. However, the rotatable structure 34 may also be rotated manually without departing from the scope of the invention.

A method of properly clocking a window with a focuser for active sensor signal optimization may comprise the steps of fixing the window 14 to the rotatable structure 34 of the window mount 30, fixing the focuser 12 proximate to the window 14 via the focuser stand 28 or other structure, and shining light through the focuser 12 into the window 14. Next, the method may include receiving with the sensing device 18, via the focuser 12, a first reflection from the first surface 24 of the window 14 and a second reflection from the second surface 26 of the window 14. The sensing device 18 may, for example, sense intensities of the first reflection and the second reflection. Then, the method may include a step of calculating a delta, such as a difference between the first and second reflection intensities, as illustrated graphically in FIG. 2. The method may also include a step of rotating an orientation of the window 14 and then determining a second delta from resulting reflections. These steps may be repeated any number of times for any number of rotational orientations of the window 14. The method may further comprise comparing the deltas to determine a rotational orientation of the window 14 that results in a largest delta value, and then fixing the window 14 relative to the focuser 12 in that rotational orientation.

Figure 3:
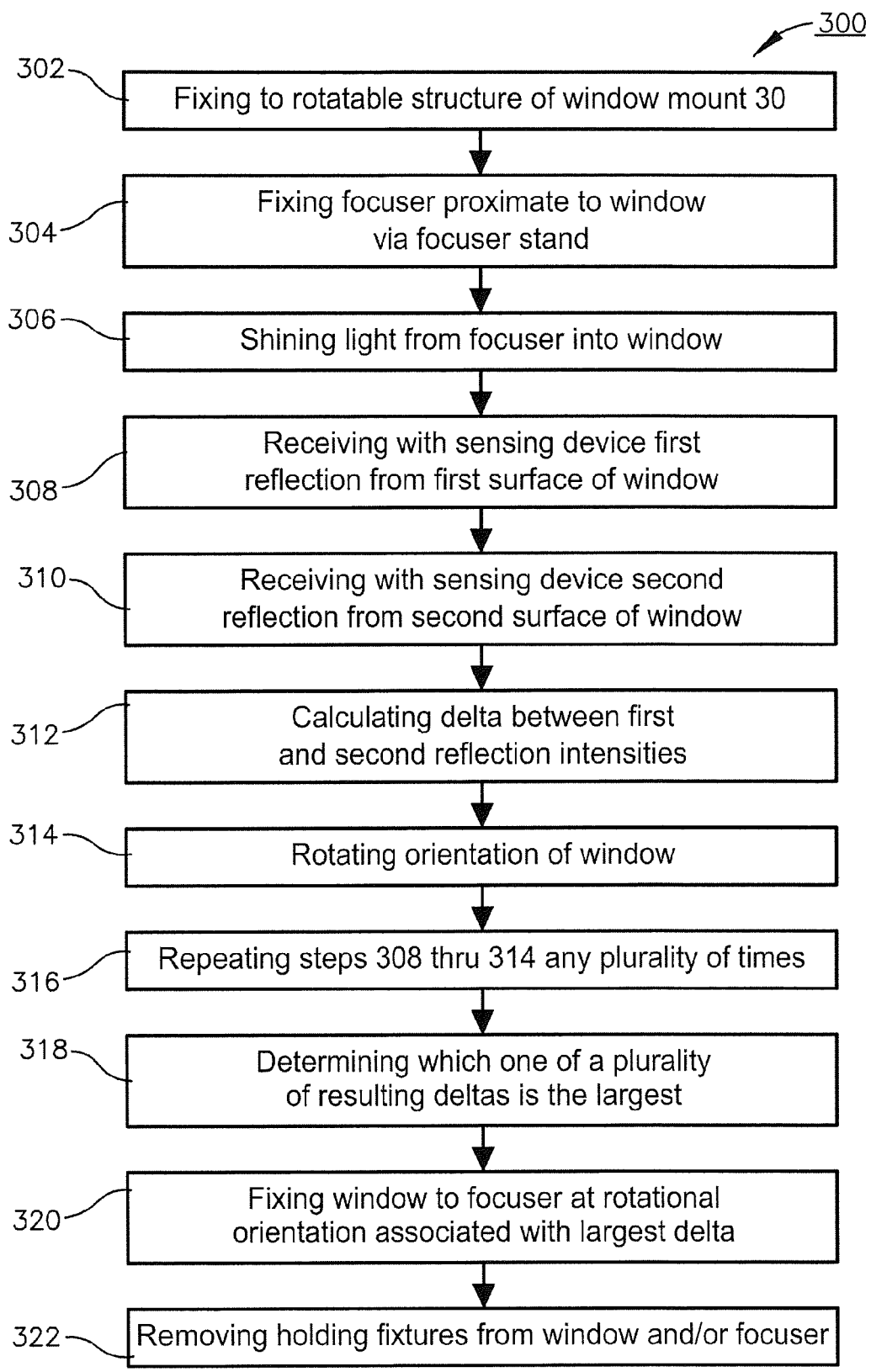
FIG. 3 is a flow chart illustrating a method of properly clocking a window with a focuser for active sensor signal optimization in accordance with embodiments of the present invention.

Method steps for properly clocking a window with a focuser for active sensor signal optimization will now be described in more detail, in accordance with various embodiments of the present invention. The steps of the method 300 may be performed in the order as shown in FIG. 3, or they may be performed in a different order. Furthermore, some steps may be performed concurrently as opposed to sequentially. In addition, some steps may not be performed. In some embodiments of the invention, some or all of the method steps may be performed by the processing device 20 and may represent code segment, algorithms, or computer-executable instructions.

As illustrated in FIG. 3, the method 300 may include the steps of fixing the window 14 to the rotatable structure 34 of the window mount 30, as depicted in block 302, and fixing the focuser 12 proximate to the window 14 via the focuser stand 28 or other structure, as depicted in block 304. For example, the window 14 may be clamped in fixed relation to the rotatable structure 34 of the window mount 30 and the focuser stand 28 may be positioned close enough and in a proper direction to allow light extending outward from the focuser 12 to shine onto a portion of the window 14. The method 300 may then include a step of shining light from the focuser 12 into the window 14, as depicted on block 306. This results in light impinging and then reflecting off of both the first surface 24 and the second surface 26 and/or the reflective material covering the second surface 26. The light may be provided in a non-perpendicular fashion, as described above. The light may be provided by the sensing device 18 or reflectometer via the fiber optic cable 22 and/or the focuser 12.

The method 300 may then include a step of receiving with the sensing device 18 a first reflection from the first surface 24 of the window 14, as depicted in block 308, and receiving with the sensing device 18 a second reflection from the second surface 26 of the window 14, as depicted in block 310. These reflections may be received substantially simultaneously and/or sequentially. One or more of these reflections may be diffuse reflections or scattered light reflections due to the second surface 26 being a texturized or diffuse surface, as described above. In some embodiments of the invention, scattered light reflections received via the focuser 12 from these first and second reflections may be transferred through an optical fiber or the fiber optic cable 22 to the sensing device 18, such as a reflectometer.

Next, the method 300 may include a step of calculating a delta, as depicted in block 312. The delta may be a difference between a sensed value of the first reflection and a sensed value of the second reflection. As described above, the sensing device 18 may be configured to sense a variety of values associated with reflected light, such as intensity measured in decibels by a reflectometer. This calculating step may be performed by a user, by the processing device 20 described above, and/or by the sensing device 18 itself without departing from the scope of the invention.

The method 300 may further including a step of rotating an orientation of the window 14, as depicted in block 314. For example, the rotatable structure 34 of the window mount 30 may be actuated to rotate the window 14, as described above. A dial with degree markings or other markings, as illustrated in FIG. 1, may be used as part of the rotatable structure 34 and/or the fixed structure 32 to determine a precise amount of rotation made. Alternatively a robotic or automated device or actuator may be provided with the precise amount of rotation desired and may actuate the dial or rotatable structure 34 by that amount. The amount may be fixed or may be variable depending on a variety of factors.

The method 300 may then include a step of repeating steps 308 through 314 any plurality of times to solve for a plurality of deltas, as depicted in block 316, with each of the deltas being associated with a particular rotational orientation of the window 14. In some embodiments of the invention, rotating the orientation of the window 14 is performed in successively smaller increments with each repetition of these steps. This may be particularly useful in fine tuning of the rotational orientation of the window 14, as described below. In other embodiments of the invention, a constant increment is used for rotation of the orientation of the window 14.

Then, the method 300 may include the steps of determining which one of the plurality of deltas is the largest, as depicted in block 318. In some embodiments of the invention, this comparison may take place after collection of all deltas for all rotational orientations are obtained, and the dial or rotational structure 34 may then be returned to the rotational orientation that corresponds to the largest one of the deltas. In a first example embodiment, the window 14 may be rotated in constant increments of 45-degrees, and once the deltas for each of those rotational orientations is recorded (manually and/or by the processing device 20), if the window 14 was at the 90-degree orientation (e.g., the dial was at the 90-degree mark) when a largest delta was obtained, then the operator or automated actuator may rotate the dial or rotational structure 34 back to the 90 degree mark before proceeding with step 320 below.

Additionally or alternatively, this comparison of the deltas may be performed by comparing each delta to a last one of the deltas. In a second example embodiment, assume that a first delta is recorded for a first rotational orientation of the window 14 and then the window 14 is rotated in a clockwise direction by a first amount to a second rotational orientation, and a second delta for the second rotational orientation of the window 14 is determined to be larger than the first delta. Then the next rotation of the window 14 by the first amount, or by a second amount that is smaller than the first amount, may be made again in the clockwise direction to a third rotational orientation. If a third delta for the third rotational orientation of the window 14 is smaller than the second delta, a next rotation of the window by a second amount or a third amount that is smaller than the second amount may be made in the counterclockwise direction, moving the rotational orientation of the window 14 back toward the second rotational orientation at which the larger second delta was sensed. In this way, the method 300 described herein may be used for fine tuning of the rotational orientation of the window 14.

This fine tuning method, as in the second example embodiment described above, may also be used subsequent to determining the largest delta using a constant increment of rotation, as in the first example embodiment. For instance, the second example embodiment may be used as a way to fine tune the results achieved via the first example embodiment. Recall that, in the first example above, 45-degree increments were used and a 90-degree rotational orientation was determined to have the largest delta. The dial was then moved to 90 degrees. At that point, the fine tuning of the second example could be performed at decreasingly smaller increments of rotation. The direction of this rotation during fine tuning can change depending on if the current delta is larger or if the previous delta was larger. This fine tuning may be repeated any number of times and decremented down to any interval of rotation required for a desired level of precision.

Finally, the method 300 may comprise the steps of fixing the window 14 to the focuser 12 at a rotational orientation associated with the largest one of the plurality of deltas, as depicted in block 320, and removing the window mount 30 from the window 14, as depicted in block 322, after the window 14 and the focuser 12 are fixed together. The fixing of the focuser 12 may be referred to herein as staking the window 14 to the focuser 14. For example, cyanoacrylate adhesive or another suitable adhesive may be used to stake the focuser 12 into a frame or housing 48 fixed to a surface of the window 14 or alternatively surrounding the window 14. Then a fillet of urethane adhesive or another suitable adhesive may be applied to fully bond the focuser 12 in the window 14. However, other methods of fixing the focuser 12 to the window 14 may be used without departing from the scope of the invention.

Although the invention has been described with reference to the embodiments illustrated in the attached drawing figures, it is noted that equivalents may be employed and substitutions made herein without departing from the scope of the invention as recited in the claims. For example, in some alternative embodiments of the invention, instead of changing the rotational orientation of the window 14 about an axis perpendicular to the window surfaces 24,26 for each subsequent delta, other positional or rotational parameters of the window 14 may be altered, such as the window 14 being moved toward and away, up and down, and/or side-to-side relative to the focuser 12, or such as being rotated toward or away from the focuser 12 in an up-down direction and/or a side-to-side direction.

Having thus described various embodiments of the invention, what is claimed as new and desired to be protected by Letters Patent includes the following:

1. A method of optimizing a fiber optic sensor having a fiber optic focuser and a window, the method comprising:
   (a) shining light through the fiber optic focuser into the window;
   (b) receiving with a sensing device a first reflection from a first surface of the window and a second reflection from a second surface of the window;
   (c) calculating a delta between a sensed value of the first reflection and a sensed value of the second reflection, as sensed with the sensing device;
   (d) rotating an orientation of the window relative to the fiber optic focuser;
   (e) repeating steps (b) through (d) to solve for a plurality of deltas;
   (f) determining which one of the plurality of deltas is the largest; and
   (g) fixing the window in the orientation associated with a largest one of the plurality of deltas.

2. The method of claim 1, wherein a holding fixture holds the window and is actuatable to rotate the orientation of the polymer window.

3. The method of claim 1, wherein rotating the orientation of the window is performed in successively smaller increments.

4. The method of claim 1, wherein the window is rotated about an axis extending substantially perpendicular to the first surface or the second surface thereof.

5. The method of claim 1, further comprising a step of fixing the fiber optic focuser to the window at the orientation associated with the largest one of the plurality of deltas.

6. The method of claim 5, further comprising a step of removing the holding fixture from the window.

7. The method of claim 1, wherein the second surface of the window is texturized and covered with a reflective material, such that the second surface produces a diffuse reflection of the light shining thereon.

8. The method of claim 1, wherein the window is a polymer window.

9. The method of claim 1, wherein the sensing device is a reflectometer.

10. The method of claim 1, wherein the sensing device measures intensity or compressions of the window based on Doppler effects.

\* \* \* \* \*

UNITED STATES PATENT AND TRADEMARK OFFICE
CERTIFICATE OF CORRECTION

PATENT NO. : 9,921,085 B2
APPLICATION NO. : 14/845131
DATED : March 20, 2018
INVENTOR(S) : Ryand Jeremy Ferguson Tucker Page 1 of 1

It is certified that error appears in the above-identified patent and that said Letters Patent is hereby corrected as shown below:

In the Specification

Column 1, Line 3, after title add:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Fourteenth Day of April, 2020

Andrei Iancu
*Director of the United States Patent and Trademark Office*